United States Patent
Bayer

(10) Patent No.: US 12,510,160 B2
(45) Date of Patent: Dec. 30, 2025

(54) CASSETTE SEAL

(71) Applicant: AGCO International GmbH, Neuhausen (CH)

(72) Inventor: Klaus Bayer, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/482,950

(22) Filed: Oct. 9, 2023

(65) Prior Publication Data
US 2024/0159316 A1 May 16, 2024

(30) Foreign Application Priority Data

Nov. 14, 2022 (GB) ................................. 2216964

(51) Int. Cl.
| | |
|---|---|
| *F16J 15/32* | (2016.01) |
| *F16J 15/3212* | (2016.01) |
| *F16J 15/3236* | (2016.01) |
| *F16J 15/3256* | (2016.01) |

(52) U.S. Cl.
CPC ....... *F16J 15/3256* (2013.01); *F16J 15/3212* (2013.01); *F16J 15/3236* (2013.01)

(58) Field of Classification Search
CPC .. F16J 15/3212; F16J 15/3236; F16J 15/3252; F16J 15/3248; F16J 15/3256
See application file for complete search history.

(56) References Cited

U.S. PATENT DOCUMENTS

| | | | | |
|---|---|---|---|---|
| 5,096,207 A | * | 3/1992 | Seeh | F16J 15/3256 277/575 |
| 5,183,269 A | * | 2/1993 | Black | F16J 15/3256 277/420 |
| 5,201,529 A | * | 4/1993 | Heinzen | F16J 15/3256 277/411 |
| 8,353,519 B2 | | 1/2013 | Kobayashi | |

(Continued)

FOREIGN PATENT DOCUMENTS

| | | | | |
|---|---|---|---|---|
| CN | 110462265 A | | 11/2019 | |
| DE | 102005006445 A1 | * | 8/2006 | .......... F16C 33/7876 |

(Continued)

OTHER PUBLICATIONS

UK Intellectual Property Office, Search report for related UK Application No. GB2216964.3, dated May 19, 2023, 4 pages.

*Primary Examiner* — Christine M Mills
*Assistant Examiner* — L. Susmitha Koneru

(57) ABSTRACT

A cassette seal for sealing an annular gap between a shaft and a housing has an annular rotational member for mounting rotationally fast with the shaft and an annular stationary member for mounting to the housing. The stationary member has a sealing lip resiliently engaging the rotational member to form an oil seal between them. The rotational member has secondary sealing lips engaging the stationary member axially outboard of the oil sealing lip. The stationary member has a radially extending portion located axially outboard of the at least one secondary sealing lip. The rotational member comprises at least one exterior sealing lip extending radially outward and axially inward to engage an outward directed axial surface of the radially extending portion of the outer member.

8 Claims, 3 Drawing Sheets

(56) References Cited

U.S. PATENT DOCUMENTS

| | | | | |
|---|---|---|---|---|
| 8,474,825 B2* | 7/2013 | Nakagawa | ............. | F16J 15/164 |
| | | | | 277/572 |
| 10,240,677 B2* | 3/2019 | Angiulli | ............... | F16J 15/3268 |
| 2008/0128997 A1* | 6/2008 | Berdichevsky | ...... | F16J 15/3264 |
| | | | | 277/366 |
| 2011/0044569 A1* | 2/2011 | Haepp | ................... | F16C 33/768 |
| | | | | 384/480 |
| 2016/0298769 A1* | 10/2016 | Angiulli | ............... | F16C 33/805 |
| 2023/0286320 A1* | 9/2023 | Watanabe | ............ | F16J 15/3276 |

FOREIGN PATENT DOCUMENTS

| | | |
|---|---|---|
| EP | 0337893 A1 | 10/1989 |
| JP | 2000193097 A | 7/2000 |
| JP | 2007292192 A | 11/2007 |

\* cited by examiner

CASSETTE SEAL

CROSS-REFERENCE TO RELATED APPLICATIONS

This application claims the benefit of the filing date of U.K. Patent Application 2216964.3, "Cassette Seal," filed Nov. 14, 2022, the entire disclosure of which is incorporated herein by reference.

FIELD

Embodiments of the present disclosure relate generally to a cassette seal for sealing an annular gap between a rotatable shaft and an aperture in a housing through which the shaft passes. Embodiments of the present disclosure relate in particular, but not exclusively, to such a cassette seal for a final drive in an axle of a mobile machine such as a tractor or other agricultural vehicle.

BACKGROUND

Cassette seals (also referred to as cartridge seals) are known for sealing between a shaft which in use is rotated about its axis and a surface of an aperture in a housing through which the shaft projects. Often the housing will contain oil and the cassette seal includes oil seals for preventing oil escaping through the aperture about the shaft. This type of known cassette seal has a rotational inner member, which is fitted to and rotates with the shaft, and a stationary outer member, which is an interference fit in the aperture of the housing and so remains static. The rotational member typically carries an elastomeric sealing member that forms a static oil seal with the shaft, and the outer member carries another elastomeric sealing member that forms a static oil seal with the surface the housing aperture. The outer member also has an oil sealing lip resiliently biased onto a sealing surface formed on the rotational inner member so as to form a rotary oil seal between stationary and rotational members. In applications where the aperture is in an outer wall of the housing so that the shaft projects externally of the housing through the aperture, and where the cassette seal separates an internal volume of the housing at an axially inner end of the cassette seal from atmosphere at an axially outer end of the cassette seal, it is also known for the inner member to carry secondary or dust sealing lips that engage a sealing surface of the outer member at a position axially outboard of the oil sealing lip. The secondary sealing lips help to prevent dust and other contaminants entering the cassette seal between the stationary and rotational members from reaching the oil sealing lip.

BRIEF SUMMARY

Some embodiments include a cassette seal and a mobile machine having an axle with a final drive incorporating such a cassette seal between a drive shaft and an aperture of a housing of the final drive through which the drive shaft projects.

In some embodiments, a cassette seal is configured for sealing an annular gap between a shaft having a longitudinal axis and mounted for rotation about its longitudinal axis and a surface defining an aperture in a housing through which the shaft projects and for separating an internal volume of the housing at an axially inner end of the cassette seal from atmosphere at an axially outer end of the cassette seal. The cassette seal has an annular rotational member for mounting rotationally fast with the shaft and an annular stationary member for mounting to the surface of the housing defining the aperture. The stationary member comprises a sealing element for forming a static oil seal with the surface of the housing, and the rotational member comprises a sealing element for forming a static oil seal with the shaft. The stationary member encircles at least part of the rotational member and has a sealing lip resiliently engaging a sealing surface on the rotational member to form an oil seal between the stationary and rotational members. The rotational member comprises at least one secondary sealing lip engaging a sealing surface of the stationary member at a position axially outboard of the oil sealing lip. The stationary member has a radially extending portion located axially outboard of the at least one secondary sealing lip, wherein the rotational member comprises at least one exterior sealing lip extending radially outward and axially inward to engage an outer surface of the radially extending portion of the stationary outer member.

The at least one exterior sealing lip may act as a further level of protection in addition to the at least one secondary sealing lip in preventing dust, dirt, and other contaminants from entering the cassette seal as far as the oil sealing lip. It is an advantage that any contaminants that do pass the at least one exterior sealing lip can be ejected back past the exterior sealing lip when the inner member is rotated with the shaft due to centrifugal force.

The rotational member may comprise a cover portion located axially outboard of the at least one exterior sealing lip, the cover portion extending radially outward and axially inward to at least partially enclose the exterior sealing lip, the cover portion being more rigid than the exterior sealing lip.

The stationary member may comprise a first reinforcing member having an axially extending cylindrical region for engagement with the surface of the housing defining the aperture and a radially extending region at an axial outer end of the axially extending cylindrical region, wherein the radially extending portion of the stationary member may be defined by the radially extending region of the reinforcing member.

In an embodiment, the radially extending portion of the stationary member extends radially outward, the arrangement configured such that in use, the radially extending portion of the stationary member locates adjacent an outer surface of the housing which surface extends radially about the aperture.

The rotational member may comprise two of the exterior sealing lips radially spaced apart.

In an embodiment, the rotational member comprises a second reinforcing member having a first axially extending cylindrical region for location adjacent the shaft and carrying a first elastomeric sealing member which comprises the sealing element for forming a static oil seal with the shaft. The second reinforcing member has a first radially extending region extending radially outward at an axial outer end of the first axially extending cylindrical region. A second axially extending cylindrical region extends axially outward from a radially outer end of the first radially extending region, and a second radially extending region extends radially outward at an axially outer end of the second axially extending cylindrical region. The rotational member has a further elastomeric sealing member attached to the second axially extending cylindrical region and the second radially extending region, the further elastomeric member comprising the at least one secondary sealing lip and the at least one exterior sealing lip.

In an embodiment, the further elastomeric member comprises an axially extending portion attached to the second axially extending cylindrical region of the second reinforcing member and a radially extending portion attached to the second radially extending region of the second reinforcing member. The at least one secondary lip extends radially outward and axially outward from the axially extending portion of the further elastomeric member, and the at least one exterior sealing lip extends radially outward and axially inward from the radially extending portion of the further elastomeric member.

The cover may comprise a cover region of the second reinforcing member, the cover region extending radially outward and axially inward from a radial outer end of the second radially extending region. A free end of the cover may be located proximal to but spaced from the outer surface of the radially extending portion of the stationary outer member.

In another embodiment, the radially extending portion of the stationary member extends radially inward.

In an embodiment, the rotational member comprises a second reinforcing member having an axially extending cylindrical region for location adjacent the shaft and a radially extending region extending radially outward at an outer axial end of the axially extending cylindrical region. The second reinforcing member carries at least one elastomeric sealing member that defines the sealing element for forming a static oil seal with the shaft, the at least one secondary sealing lip, and the at least one exterior sealing lip.

In an embodiment, the rotational member comprises a single integral elastomeric sealing member extending along a radially inner surface of the axially extending cylindrical region of the second reinforcing member and an axially outer surface of the radially extending region of the second reinforcing member. The elastomeric sealing member has a first lip portion and a second lip portion, the first lip portion extending axially inward at a radial outer end of the radially extending region of the second reinforcing member, the at least one secondary sealing lip extending radially outward and axially outward from the first lip portion, the second lip portion extending axially outward at the radial outer end of the radially extending region of the second reinforcing member, the at least one exterior sealing lip extending radially outward and axially inward from the second lip portion.

Where the cassette seal has a cover, the cover may be attached to the at least one elastomeric sealing member and may be clipped to the at least one elastomeric sealing member. The cover may extend radially outboard of the stationary member, the arrangement configured such that in use, a free end of the cover locates proximal to but spaced from an axially directed outer surface of the housing extending radially about the aperture.

The radially extending region of the first reinforcing member may at least partially enclose the at least one secondary sealing lip.

There may be two secondary sealing lips spaced apart axially, and an axial outermost one of the secondary sealing lips may engage an inwardly directed axial surface of the radially extending region of the first reinforcing member.

In some embodiments, a mobile machine has an axle with a final drive, the final drive including a drive shaft extending through an aperture in a housing of the final drive, wherein a cassette seal as described herein is mounted to seal an annular gap between the drive shaft and a surface defining the aperture in the final drive housing.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the accompanying drawings, in which.

DETAILED DESCRIPTION

Figure 1:
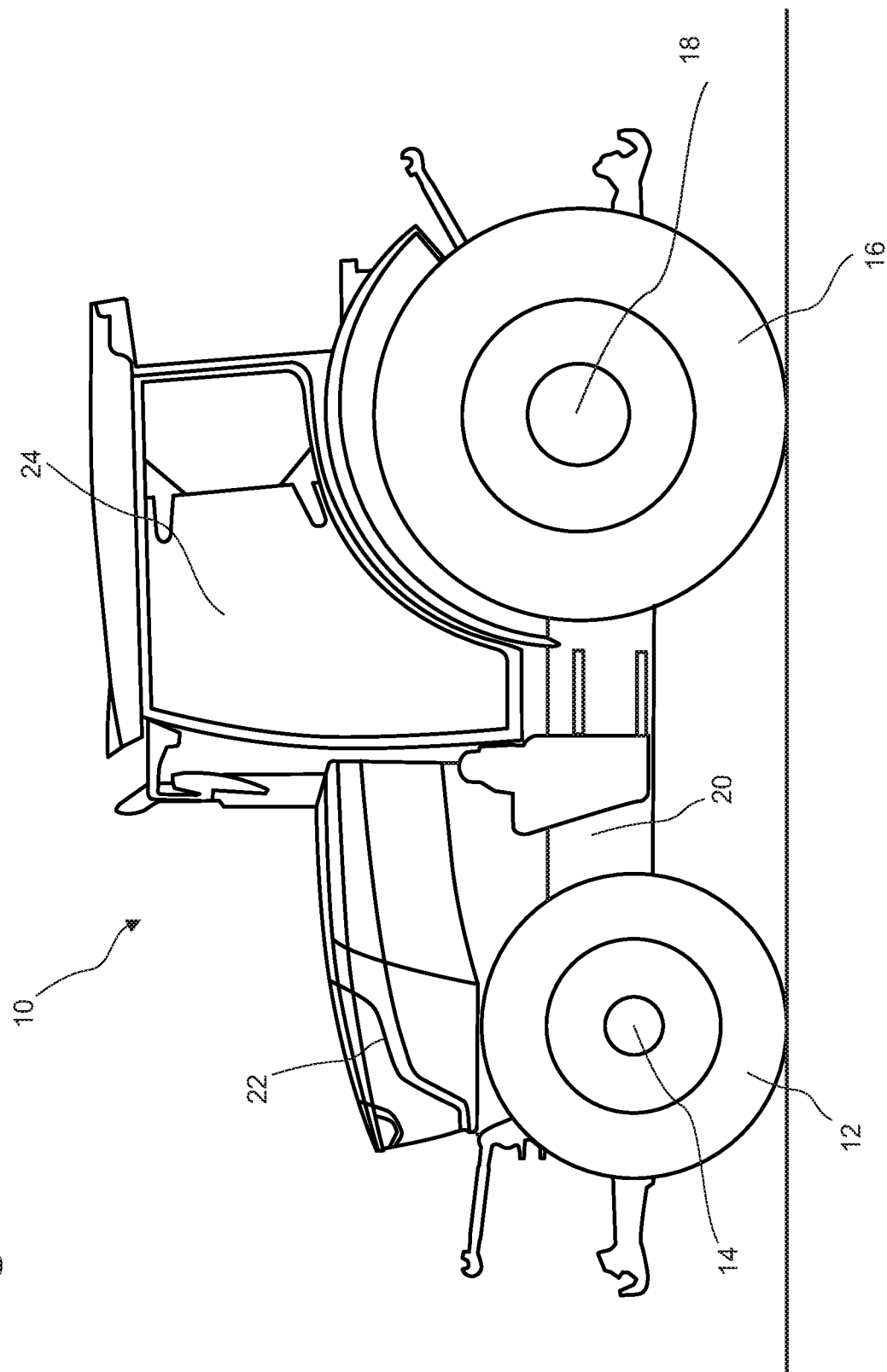
FIG. 1 is view from one side of an agricultural tractor.

With reference initially to FIG. 1, a mobile machine in the form of an agricultural tractor 10 has front wheels 12 mounted to a front axle 14 and rear wheels 16 mounted to a rear axle 18. The tractor has a chassis 20 and an engine compartment 22 in which an engine or other prime mover is located. An operator cab 24 is mounted to the chassis 20 to the rear of the engine compartment 22.

Figure 2:
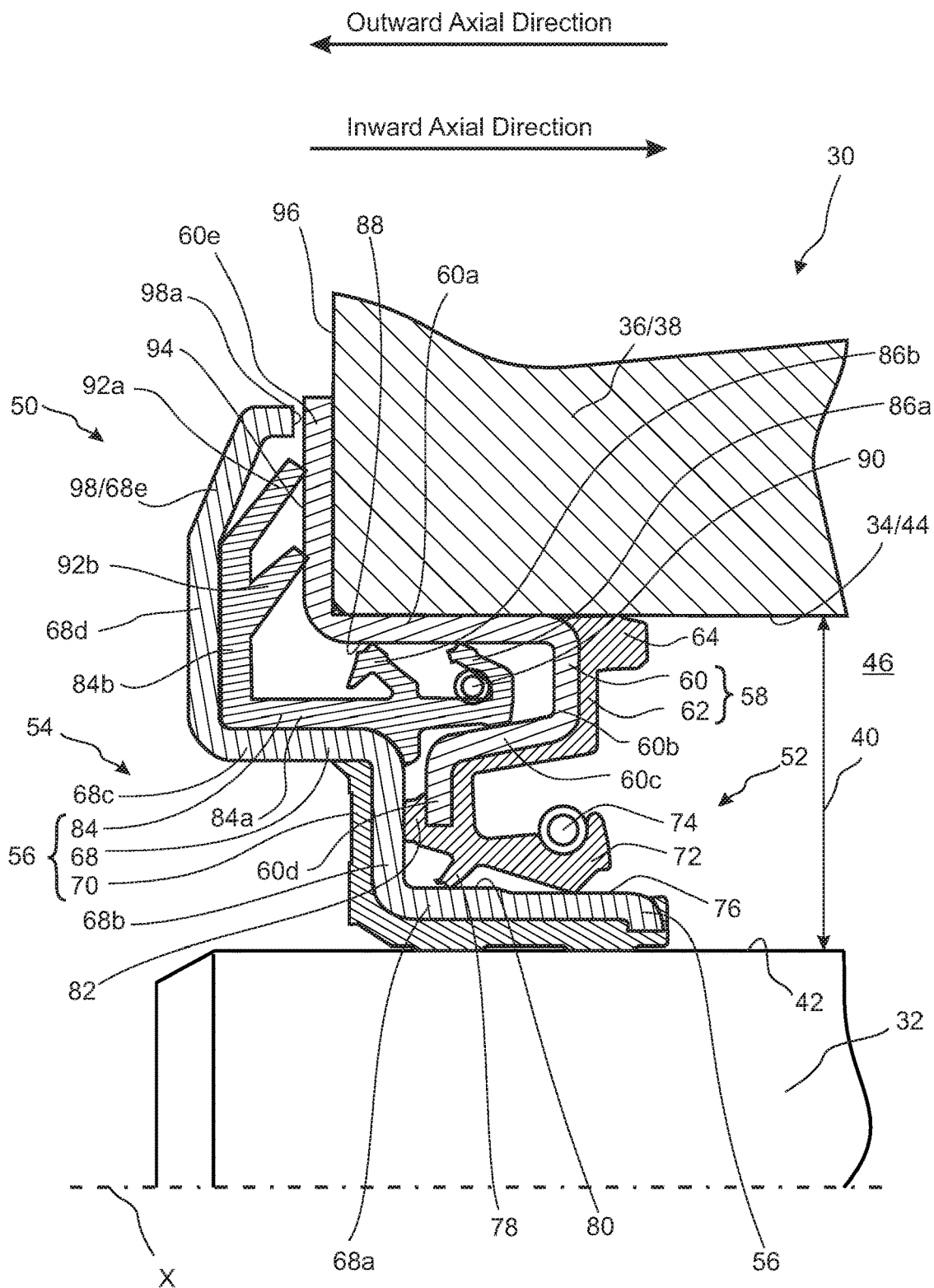
FIG. 2 is a simplified cross-sectional view through part of final drive of the tractor of FIG. 1, illustrating a first embodiment of cassette seal sealing an annular gap (i.e., a radial gap) between a drive shaft and a surface defining an aperture in a housing of the final drive through which the drive shaft extends.

With reference also to FIG. 2, at least one of the front and rear axles 14, 18 has a final drive 30 including at least one drive shaft 32 extending through an aperture 34 in a wall 36 of a housing 38 of the final drive 30. The drive shaft 32 (only an upper portion of an end region of which is shown in FIG. 2) is driven to rotate about its longitudinal axis X and is mounted with a clearance or annular gap 40 between its outer cylindrical surface 42 and a surface 44 of the housing defining the aperture 34. The annular gap 40 is shown on an enlarged scale for clarity.

Oil is contained within an interior volume 46 of the housing and a cassette seal 50 is provided to seal the annular gap 40 between the drive shaft 32 and the surface 44 of the housing to prevent oil escaping from the interior volume 46 of the housing. The wall 36 is an exterior wall so that the cassette seal 50 also serves to separate the interior volume 46 of the housing from atmosphere. An axial end 52 of the cassette seal 50 adjacent the interior volume will be referred to as an inner axial end, and an axial end 54 of the cassette seal which is exposed to atmosphere will be referred to as an outer axial end.

In addition to preventing oil escaping from the interior volume 46 of the final drive housing 38, the cassette seal 50 is operative to prevent dust and other contaminants from entering the interior 46 of the housing 38 from the outside. This is particularly important for an agricultural vehicle such as a tractor 10, which is often operated in dusty and dirty conditions in fields and the like and where the final drive 30 in particular is located close to the ground and so exposed to any dust or other contaminants thrown up by the wheels 12, 14 or agriculture implements attached to the tractor 10.

The cassette seal 50 has a radially inner member 56 and a radially outer member 58. The radially inner member 56 is mounted rotationally fast with the drive shaft 32 so that it rotates with the drive shaft 32. The inner member will be referred to as a rotational member 56. The radially outer member 58 is mounted with an interference fit to the surface 44 of the housing and so does not rotate. The radially outer member will be referred to as a stationary member 58. Both the rotational member 56 and the stationary member 58 are annular.

The rotational member 56 has an axis of rotation which is coaxial with the longitudinal axis of the drive shaft 32 when in use. Indeed the axis X can be considered an axis of the cassette seal 50. For the avoidance of doubt, directional terms such as axial, axially, radial, or radially and the like as used herein should be understood with reference to the longitudinal axis X of the drive shaft 32/axis of the cassette seal 50. Thus terms such as axial and axially and the like refer to directions parallel to the longitudinal axis X of the drive shaft/axis of the cassette seal whilst terms such as radial or radially and the like refer to directions perpendicular to the longitudinal axis X of the drive shaft/axis of the cassette seal 50.

The stationary member 58 has a reinforcing member 60, referred to herein as a first reinforcing member. The first reinforcing member 60 has an axially extending cylindrical region 60a which is an interference fit to the surface 44 of the housing defining the aperture 34, a first radially extending region 60b which extends radially inward at an axial inner end of the axially extending region 60a, an inclined region 60c which extends radially inward and axially outward from the inner radial end of the first radially extending region 60b. A second radially extending region 60d extends radially inward at the radially inner end of the inclined region 60c. A sealing element in the form of a first elastomeric sealing member 62 is attached to the first reinforcing member 60. A part 64 of the first elastomeric sealing member 62 engages the surface 44 of the housing to form a static oil seal with the surface 44 of the housing.

The rotational member 56 also has a reinforcing member 68, referred to herein as a second reinforcing member. The second reinforcing member 68 has a first axially extending cylindrical region 68a which locates proximal to the surface 42 of the drive shaft 32, a first radially extending portion 68b which extends radially outward towards the stationary member 58 at an axially outer end of the first axially extending region 68a, a second axially extending cylindrical region 68c which extends axially outward from the outer radial end of the first radially extending region 68b, and a second radially extending region 68d which extends radially outward from an outer axial end of the second axially extending region 68b.

A second elastomeric sealing member 70 is attached to a radially inner surface of the first axially extending region 68a of the second reinforcing member 68 and extends along an axial outer surface of the first radially extending region 68b. The second elastomeric sealing member grips the surface 42 of the drive shaft 32 tightly to form a static oil seal with the drive shaft 32 and to hold the rotational member 56 rotationally fast with the drive shaft 32.

The first elastomeric sealing member 62 defines a sealing lip 72 which is biased by a spring 74 to engage a first sealing surface 76 defined on a radially inner side of the first axially extending cylindrical region 68a of the second reinforcing member 68 to form an oil seal between the rotational and stationary members 56, 58. A supplementary sealing lip 78 extends radially inward and axially outward to engage a further sealing surface 80 defined on a radially inner side of the second reinforcing member 68. The first elastomeric sealing member 62 also defines a spacer 82 which engages an axially inner side of the first radially extending region 68b of the second reinforcing member 68 of the rotational member 56 to maintain a desired axial spacing between the rotational and stationary members 56, 58.

A further (i.e., a third) elastomeric sealing member 84 is attached to the second reinforcing member 68. The further elastomeric sealing member 84 has an axially extending portion 84a attached to a radially outer face of the second axially extending cylindrical region 68c. The axially extending portion 84a projects axially inward beyond the first radially extending region 68b of the second reinforcing member and contacts the inclined region 60c of the first reinforcing member 60. Two secondary sealing lips 86a, 86b project radially outward and axially outward from the radially outer surface of the axially ending portion 84a of the further elastomeric sealing member 84 to engage a radially inner sealing surface 88 of the axially extending cylindrical region 60a of the first reinforcing member 60. The two secondary sealing lips 86a, 86b are spaced axially apart and a further spring 90 is operative to bias an axially innermost one of the secondary sealing lips 86a into engagement with the sealing surface 88 of the first reinforcing member and the axially inner end of the further elastomeric sealing member 84 into engagement with the inclined region 60c of the first reinforcing member 60.

The further elastomeric sealing member 84 also has a radially extending portion 84b attached to an axially directed inner surface of the second radially extending region 68d of the second reinforcing member 68. The radially extending portion 84 carries two exterior sealing lips 92a, 92b that are spaced apart radially. A distal end of each of the exterior sealing lips 92a, 92b engages an axially directed outer surface 94 of a third radially extending region 60e of the first reinforcing member 60. The third radially extending region 60e of the first reinforcing member 60 extends radially outward at an axial outer end of the axially extending cylindrical region 60a of the first reinforcing member 60 and defines a radially extending portion of the stationary member 58 located axially outboard of the secondary sealing lips 86a, 86b. The third radially extending region 60e projects radially outside the aperture 34, and an axially inward directed surface of the third radially extending region 60e is arranged to abut, or at least to lie in close proximity to, an axially outward directed surface 96 of the housing, which surface extends radially outboard of the aperture.

The exterior sealing lips 92a, 92b are partially enclosed by a cover 98 formed in this embodiment by a region 68e of the second reinforcing member 68 which extends radially outward and axially inward from the outer radial end of the second radially extending region 68d of the second reinforcing member 68. A distal, free end 98a of the cover locates close to but slightly spaced from the outer surface 94 of the third radially extending region 60e of the first reinforcing member 60.

The secondary sealing lips 86a, 86b are operative to prevent contaminants such as dust, dirt and the like entering the cassette seal 50 from outside from passing through to the oil sealing lip 72. However, particularly when used in heavily contaminated environments, such as is the case for a final drive of a tractor operating in a field, they may not be wholly effective. A particular issue is that dust and dirt entering the cassette seal can become trapped in the cassette seal 50 by the secondary sealing lips 86a, 86b and may cause wear to the seal. The exterior sealing lips 92a, 92b provide an additional level of protection against contaminants entering the cassette seal 50. Furthermore, because the exterior sealing lips 92a, 92b extend radially outward to engage an outer surface 94 of the third radially extending region 60e of the first reinforcing member 60 outside of the aperture 34, should any dust, dirt, or other contaminants enter the cassette seal 50 past the exterior sealing lips 92a, 92b and be held between them and the secondary sealing lips 86a, 86b, the contaminants are able to be expelled from the cassette seal 50 back past the exterior sealing lips 92a, 92b by centrifugal force when the rotational member 56 is rotated with the drive shaft 32. Removing such contaminants reduces the risk of their damaging the cassette seal 50.

The cover 98 is more rigid than the exterior sealing lips 92a, 92b, and helps to protect the lips from external forces and debris including high external pressure. For example, when cleaning a final drive 30 of a tractor using a pressure washer, the cover 98 helps to protect the exterior sealing lips 92a, 92b from damage during and mitigates against such pressure washing forcing contaminants past the exterior sealing lips 92a, 92b.

Though the embodiment of FIG. 2 has two exterior sealing lips 92a, 92b, the cassette seal 50 may have only one exterior sealing lip or may have three or more exterior sealing lips 92a, 92b. Similarly, the cassette seal 50 may have only one secondary sealing lip 86a, 86b or may have three or more secondary sealing lips. Furthermore, though providing the secondary sealing lip(s) 86a, 86b and the exterior sealing lip(s) 92a, 92b on a single integral elastomeric member 84 attached to the second reinforcing member 68 simplifies manufacturing, the sealing lips 86a, 86b, 92a, 92b may be provided on two or more discrete elastomeric sealing members attached to the second reinforcing member 68.

Figure 3:
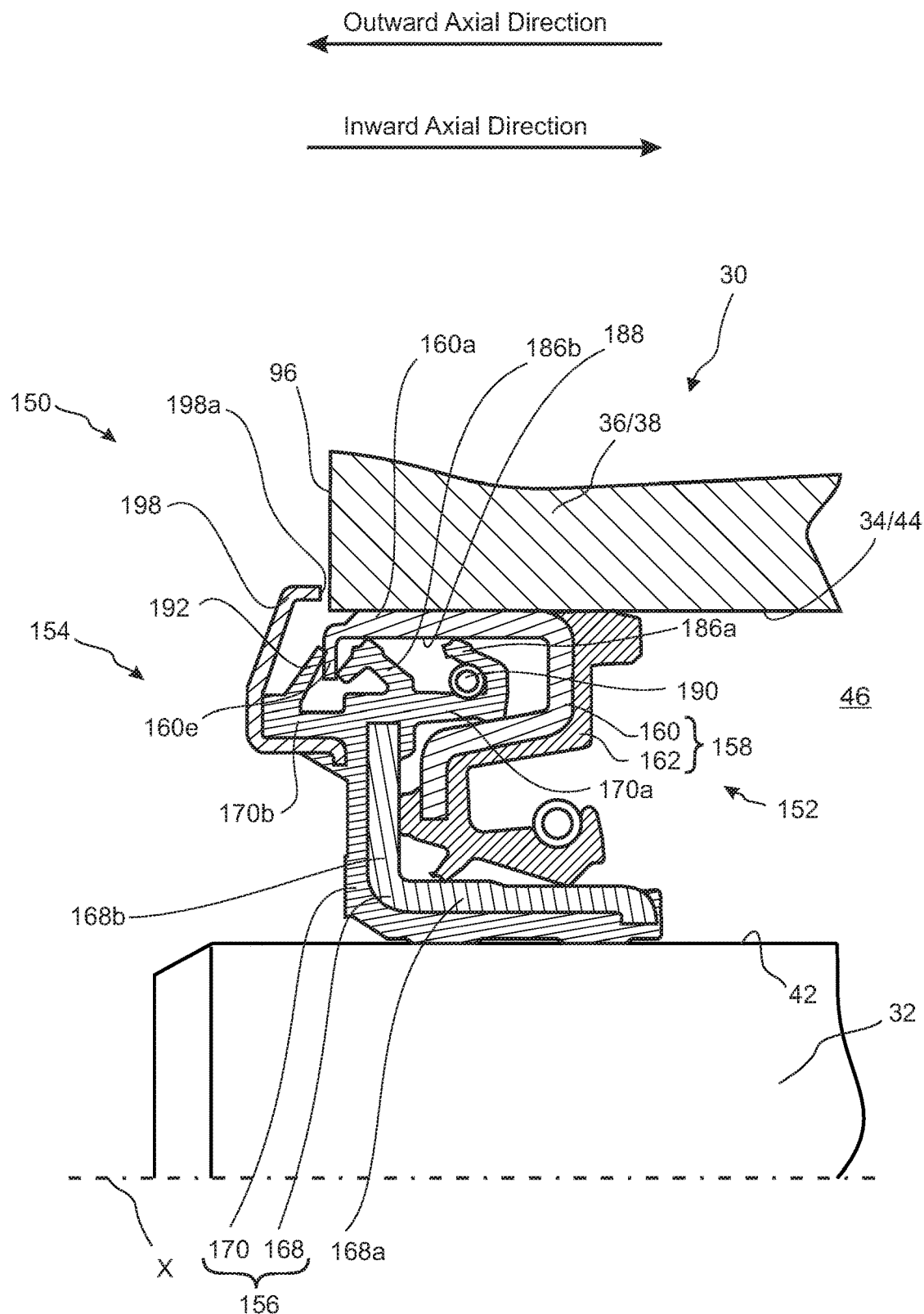
FIG. 3 is a view similar to that of FIG. 2 but illustrating a second embodiment of a cassette seal.

FIG. 3 illustrates an alternative embodiment of a cassette seal 150 which is similar to the embodiment shown in FIG. 2 and described above. Accordingly, only the major differences of the cassette seal 150 over the cassette seal 50 of the previous embodiment will be described in detail. Features of the cassette seal 150 which are the same as, or which serve a similar function to, those of the previous embodiment 50 will be given the same reference numerals but increased by 100 in each case.

In the cassette seal 150 according to the second embodiment, the third radially extending region 160e of the first reinforcing member 160 extends radially inward at the axial outer end of the axially extending region 160a to define a radially extending portion of the stationary member 158 axially outboard of the secondary sealing lips 186a, 186b.

The second reinforcing member 168 of the rotational member 156 is simpler than that of the previous embodiment having only a single axially extending cylindrical region 168a equivalent to the first axially extending cylindrical region 68a in the previous embodiment and a single radially extending region 168b, equivalent to the first radially extending region 68b in the previous embodiment.

The inner rotational member 156 in this embodiment carries a single elastomeric member 170, referred to as a second elastomeric member to differentiate it from the first elastomeric member 160 of the stationary member 158. The second elastomeric member 170 extends axially long the radially inner surface of the axially extending cylindrical region 168a of the second reinforcing member 168 and radially along the axial outer surface of the radially extending portion 168b of the second reinforcing member 168. Where the second elastomeric member 170 extends axially long the radially inner surface of the axially extending cylindrical region 168a of the second reinforcing member 168 it grips the surface 42 of the drive shaft 32 tightly to form a static oil seal with the drive shaft 32 and to hold the rotational member 156 rotationally fast with the drive shaft 32.

At the radially outer end of the radially extending region 168b of the second reinforcing member 168, the second elastomeric member 170 defines a first lip portion 170a which extends axially inward beyond the radially extending region 168b of the second reinforcing member and contacts the inclined region 160c of the first reinforcing member 160. Two secondary sealing lips 186a, 186b project radially outward and axially outward from the radial outer surface of the first lip portion 170a to engage a radially inner sealing surface 188 of the axially extending cylindrical region 160a of the first reinforcing member 160. The two secondary sealing lips 186a, 186b are spaced axially apart, and a further spring 190 is operative to bias an axially innermost one of the secondary sealing lips 186a into engagement with the sealing surface 188 and the axially inner end of the first lip portion 170a into engagement with the inclined region 160c of the first reinforcing member 160. The axially outermost of the secondary sealing lips 186b in this embodiment also contacts an axially inward directed surface of the third radially extending region 160e of the first reinforcing member 160, which partially encloses the secondary sealing lips 186a, 186b. The first lip portion 170a performs a similar function to the axially extending region 84a of the further elastomeric member 84 of the previous embodiment and is constructed in a similar manner.

The second elastomeric member 168 also defines a second lip portion 170b, which projects from the outer radial end of the radially extending region 168b of the second reinforcing member axially outward beyond the third radially extending region 160e of the first reinforcing member 160. The second lip portion 170b has an exterior sealing lip 192, which projects radially outward and axially inward such that a distal, free end of the exterior lip 92 engages an axially directed outer face of the third radially extending region 160e of the first reinforcing member 160.

A cover 198 is attached to the second elastomeric member 170 axially outboard of the exterior sealing lip 192. The cover extends radially outward and axially inward to partially enclose the exterior sealing lip 192 and has a free, distal end 198a which locates close to but spaced from an axially directed outer surface 96 of the wall 36 of the housing 38 radially outboard of the aperture 34. The cover 198 may be clipped or otherwise attached to the second elastomeric member. The cover member 198 is more rigid than the second sealing member 170, and the exterior sealing lip 192 and may also act as a further reinforcing member to support the second lip portion 170b.

The exterior sealing lip 192 and the cover 198 perform similar functions to those of the embodiment shown in FIG. 2 as described above.

In alternative embodiments, there may be more than one exterior sealing lip 92 and may be more or fewer than two secondary sealing lips 186a, 186b. Furthermore, it will be appreciated that the various seals and sealing lips 186a, 186b, 192 need not be provided by a single integral sealing member 170 attached to the second reinforcing member 168 but could be provided by two or more discrete sealing members attached to the second reinforcing member 168.

The first and second reinforcing members 60, 68, 160, 168 can be made of any suitable material and by any suitable methods but in an embodiment are made of metallic material and plastically deformed into the required shape. The elastomeric sealing members 62, 70, 84, 160, 170 may be securely bonded to the respective reinforcing members in a known manner, for example by cementing or vulcanization.

What is claimed is:

1. A cassette seal for sealing an annular gap between a shaft having a longitudinal axis and mounted for rotation about its longitudinal axis and a surface defining an aperture in a housing through which the shaft projects and for separating an internal volume of the housing at an axially inner end of the cassette seal from atmosphere at an axially outer end of the cassette seal, the cassette seal comprising:

an annular rotational member for mounting rotationally fast with the shaft; and an annular stationary member for mounting to the surface of the housing defining the aperture;

wherein the stationary member comprises a sealing element for forming a static oil seal with the surface of the housing;

wherein the stationary member encircles at least part of the rotational member and has a sealing lip configured to resiliently engage a sealing surface on the rotational member to form an oil seal between the stationary and rotational members;

wherein the stationary member has a radially extending portion located axially outboard of the at least one secondary sealing lip, wherein the radially extending portion of the stationary member extends radially outward such that in use, the radially extending portion of the stationary member locates adjacent an outer surface of the housing extending radially about the aperture;

wherein the rotational member comprises a second reinforcing member having a first axially extending cylindrical region for location adjacent the shaft and carrying a first elastomeric sealing member for forming a static oil seal with the shaft, wherein the second reinforcing member has a first radially extending region extending radially outward at an axial outer end of the first axially extending cylindrical region, a second axially extending cylindrical region extending axially outward from a radially outer end of the first radially extending region, and a second radially extending region extending radially outward at an axially outer end of the second axially extending region;

wherein the rotational member has a further elastomeric sealing member attached to the second axially extending cylindrical region; and wherein the further elastomeric member comprises:

at least one secondary sealing lip configured to engage a sealing surface of the stationary member at a position axially outboard of the oil sealing lip; and at least one exterior sealing lip extending radially outward and axially inward to engage an outer surface of the radially extending portion of the stationary member.

2. The cassette seal of claim 1, wherein the rotational member comprises a cover portion located axially outboard of the at least one exterior sealing lip, the cover portion extending radially outward and axially inward to at least partially enclose the exterior sealing lip, the cover portion being more rigid than the exterior sealing lip.

3. The cassette seal of claim 1, wherein the stationary member comprises a first reinforcing member, the first reinforcing member comprising an axially extending cylindrical region for engagement with the surface of the housing defining the aperture and a radially extending region at an axial outer end of the axially extending cylindrical region, and wherein the radially extending portion of the stationary member is defined by the radially extending region of the first reinforcing member.

4. The cassette seal of claim 1, wherein the rotational member comprises two of the exterior sealing lips radially spaced apart.

5. The cassette seal of claim 1, wherein the further elastomeric member comprises an axially extending portion attached to the second axially extending cylindrical region of the second reinforcing member and a radially extending portion attached to the second radially extending region of the second reinforcing member, the at least one secondary lip extending radially outward and axially outward from the axially extending portion of the further elastomeric member and the at least one exterior sealing lip extending radially outward and axially inward from the radially extending portion of the further elastomeric member.

6. The cassette seal of claim 1, wherein the rotational member comprises a cover portion located axially outboard of the at least one exterior sealing lip, the cover portion extending radially outward and axially inward to at least partially enclose the exterior sealing lip, the cover portion being more rigid than the exterior sealing lip, and wherein the cover portion comprises a cover region of the second reinforcing member, the cover region extending radially outward and axially inward from a radial outer end of the second radially extending region.

7. The cassette seal of claim 1, wherein the rotational member comprises a cover portion located axially outboard of the at least one exterior sealing lip, the cover portion extending radially outward and axially inward to at least partially enclose the exterior sealing lip, the cover portion being more rigid than the exterior sealing lip, and wherein a free end of the cover portion is located proximal to but spaced from the outer surface of the radially extending portion of the stationary member.

8. A mobile machine having an axle with a final drive, the final drive including a drive shaft extending through an aperture in a housing of the final drive, further comprising the cassette seal of claim 1 mounted to seal an annular gap between the drive shaft and a surface defining the aperture in the final drive housing.

* * * * *